United States Patent
Dufek

(10) Patent No.: US 6,879,284 B2
(45) Date of Patent: Apr. 12, 2005

(54) METHOD AND APPARATUS FOR IDENTIFYING OBJECTS

(76) Inventor: Otto Dufek, Hohenzollernweg 18, Winnenden (DE), D-71364

( * ) Notice: Subject to any disclaimer, the term of this patent is extended or adjusted under 35 U.S.C. 154(b) by 0 days.

(21) Appl. No.: 10/731,677

(22) Filed: Dec. 9, 2003

(65) Prior Publication Data

US 2004/0169841 A1 Sep. 2, 2004

Related U.S. Application Data

(63) Continuation-in-part of application No. 10/019,182, filed as application No. PCT/DE00/01994 on Jun. 26, 2000, now abandoned.

(51) Int. Cl.[7] .................................. H04B 7/185
(52) U.S. Cl. ................ 342/357.06; 356/4.01; 356/141.1
(58) Field of Search ............... 342/357.01, 357.06, 342/357.08, 368; 356/4.01, 141.1

(56) References Cited

U.S. PATENT DOCUMENTS 3,588,255 A * 6/1971 Alexander ............... 356/152.1
3,857,641 A * 12/1974 Gass ......................... 356/438
6,650,407 B2 * 11/2003 Jamieson et al. ......... 356/141.1

* cited by examiner

Primary Examiner—Dao Phan
(74) Attorney, Agent, or Firm—Orum & Roth

(57) ABSTRACT

An optical apparatus for identification of objects whose identifying data is stored in satellite-aided transmission systems, computer systems, or other electronic systems and a method for identifying objects. An optical apparatus with a fine focus is used to view an object. The position of the apparatus, distance to the object and other data related to the object relative to the apparatus is detected and data about the object is displayed.

19 Claims, 5 Drawing Sheets

METHOD AND APPARATUS FOR IDENTIFYING OBJECTS

This application is a Continuation-in-Part of U.S. application Ser. No. 10/019,182 filed Apr. 22, 2002 now abandoned that claimed priority of PCT/DE00/01994 filed Jun. 26, 2000 and German Application 199 29 444.5 filed Jun. 26, 1999.

BACKGROUND OF THE INVENTION

The invention is an optical apparatus such as binoculars, cameras and the like for the optical detection and identification of objects such as geographical locations, historic sites persons, vehicles, and the like, whose data are stored in satellite-aided transmission systems and computer systems such as the internet.

DESCRIPTION OF RELATED ART

For a known optical apparatus of this type (DE-OS 43 12 310), the objects are detected by the computer using the data of a satellite navigation system and the compass heading and their identification is "verified cognitively". This is achieved by the intersection of two vectors, specifically first the heading vector of the compass and second the location vector of the satellite system. The disadvantage of this prior art apparatus consists of requiring a subsequent check of the information data and the object, because there is no reliable designation.

A GPS alone will not provide reliable identification of the target object. The ability of a standard (non-military) GPS to identify a location is limited. For example, the location of the GPS device is identified within ±15 m. If that data alone is used to calculate the location of an object 130 m away, there is a potential variance of 145 m in diameter. In an area with numerous closely located sites, such as Beijing's Forbidden City, standing at the Gate of Supreme Harmony would result in the identification of at least seven objects. A more accurate system is needed to instantaneously identify the specific target. One object of the present invention is to accurately identify the target object.

SUMMARY OF THE INVENTION

The inventive optical apparatus provides nearly instantaneous identification of fixed objects focused on by the device. The user receives accurate information about the object directly on the screen or viewfinder. The position of the apparatus is detected, the relative position of the object to the apparatus is detected and that information is compared to electronic data stored in a computer in the apparatus received from satellite signals, received from a wireless communication system to provide the user with identification data.

This optical apparatus contains a component for optical fine focusing on an object viewed via a target line. The target line is defined here as the axis between apparatus and object, which is defined with reference to the compass direction into which the apparatus is pointed and also by how far the apparatus is rotated above or below the horizontal. Furthermore, this apparatus contains a component to detect the distance between apparatus and the object, which may be done with optical or other means, where the display of the distance consists of data, such as electronic data, that can be processed further. The apparatus also contains a measurement unit to detect the angle of incline between global identification lines, such as magnetic identification lines, and the target line. The apparatus also contains a receiving unit to receive signals from satellites and a computer for data processing. The computer can process the distance data, data regarding the angle of incline, satellite signals as well as the data of the satellite-aided transmission systems or their storage. There is also an information display on the apparatus for the targeted display of data regarding the object, where the desired result of the computation is displayed automatically, for example as data from the satellite-aided transmission system, such as is well known in the case of locating, orienting and navigating of persons or vehicles with such satellite-aided transmission systems.

The computer of this invention also processes the distance value, which may vary with fine focus, and is programmed so that data regarding the currently selected object will appear on the information display after fine focusing. The advantage here is primarily the clean and reliable designation of information data for the object, such as a village, a specific person or a specific vehicle. Thus, the inventive apparatus can be used in many applications, such as in research or exploration projects, in emergencies and by the military, where errors may have particularly grave results.

The inventive device is used to instantly determine the target object's position including the name of the object and description and the user's exact position. The inventive optical device uses a combination of a Global Positioning Systems (GPS—Galileo Positioning System), an electronic compass, a range finder, a goniometer, an altimeter and computer containing a digital area map with points of interest such as roads, rivers, villages, etc. and other information about that area. Alternatively, the device can have a wireless communication or wireless internet capability and the map and/or other data can be downloaded.

In an advantageous embodiment of the invention, the computer works exclusively with electronic inputs.

In an additional advantageous embodiment of the invention, the display consists of a display unit with a LCD (liquid crystal display) with transparent electrodes on the display surface.

An additional advantageous embodiment of the invention uses a printer as the display to print out the results.

An additional advantageous embodiment of the invention uses an apparatus to process the data into acoustical signals and a loudspeaker as the display.

A preferred embodiment of the invention uses binoculars as the apparatus. The viewing area of the binoculars includes a display that displays the identity of the object immediately after focusing on the object.

An additional advantageous embodiment of the invention uses a navigation satellite system for the location determination of the optical apparatus. Such satellite systems are known, specifically to locate, for example, persons and vehicles for navigation within urban areas.

In an additional advantageous embodiment of the invention, the measurement unit cooperates with a compass to detect the azimuth angle between the target line and the North-South direction.

An additional advantageous embodiment of the invention uses a height-measuring device to detect the elevation angle between the target line and the horizontal and/or the vertical.

DETAILED DESCRIPTION OF THE INVENTION

Figure 1:
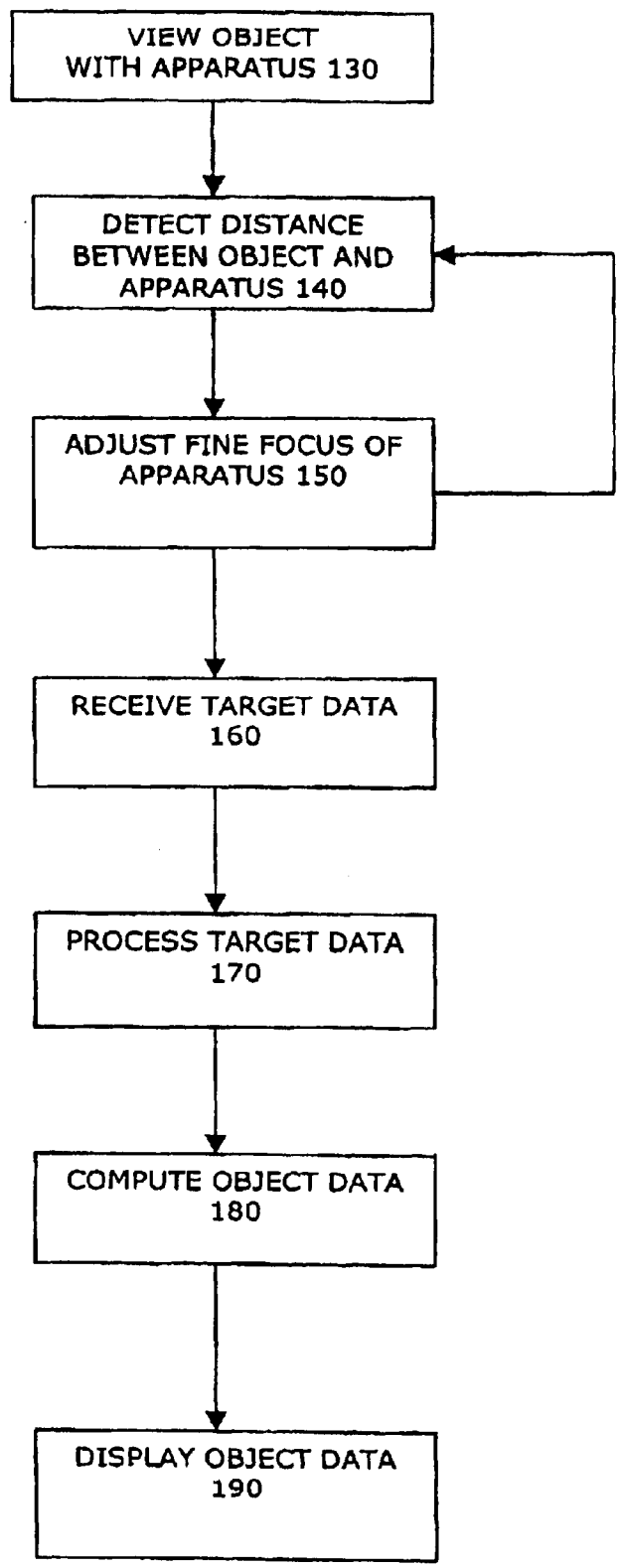
FIG. 1 is a flow chart of steps for detecting an object.
Figure 2:
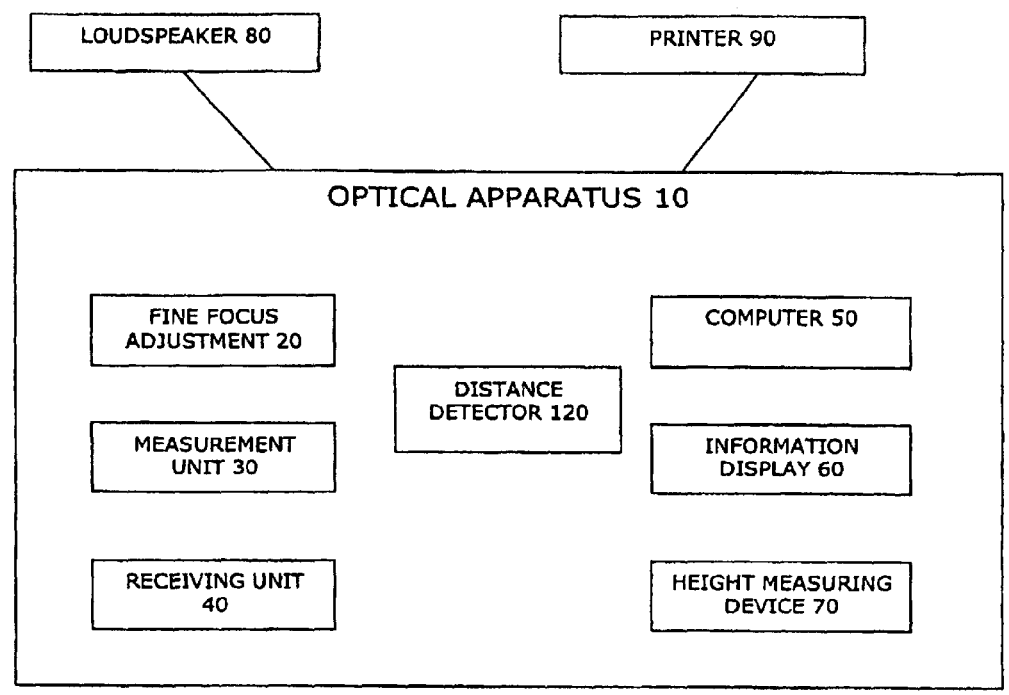
FIG. 2 is a block diagram of the apparatus.
Figure 3:
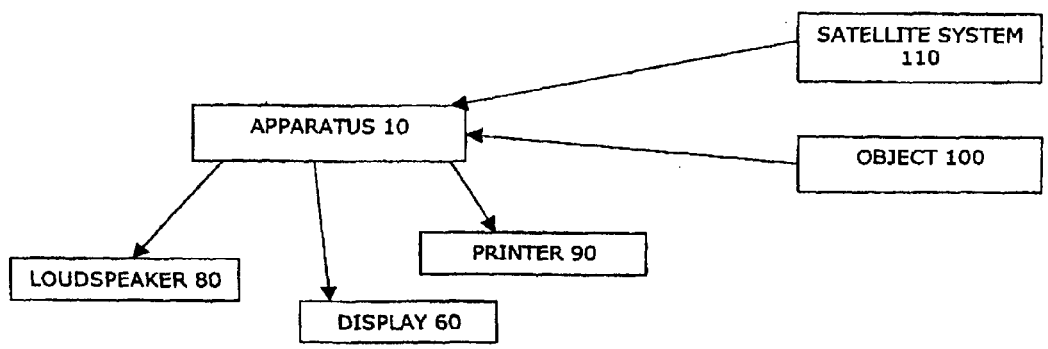
FIG. 3 is a block diagram of the apparatus in use.
Figure 4:
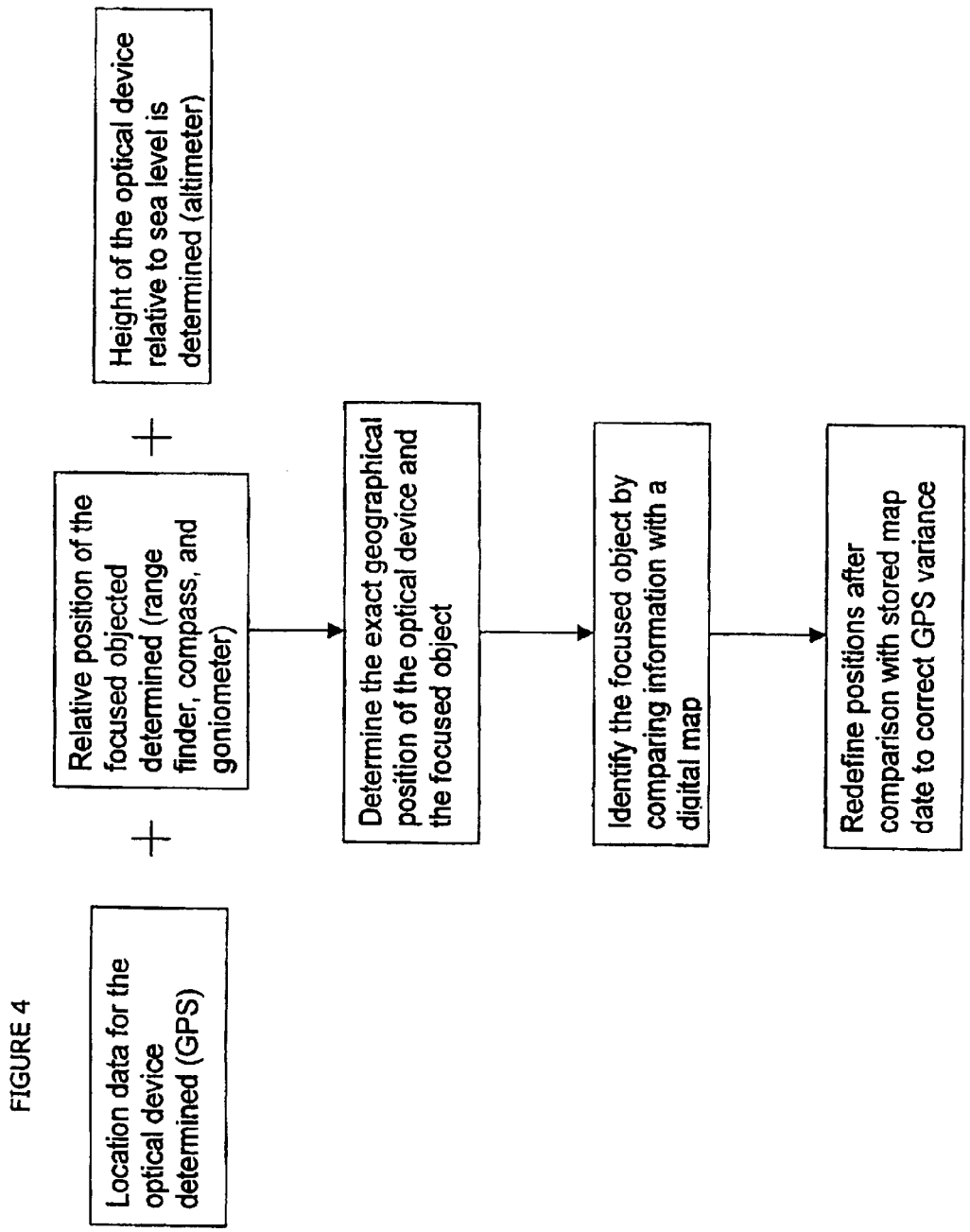
FIG. 4 is a flow chart of the apparatus in use.
Figure 5:
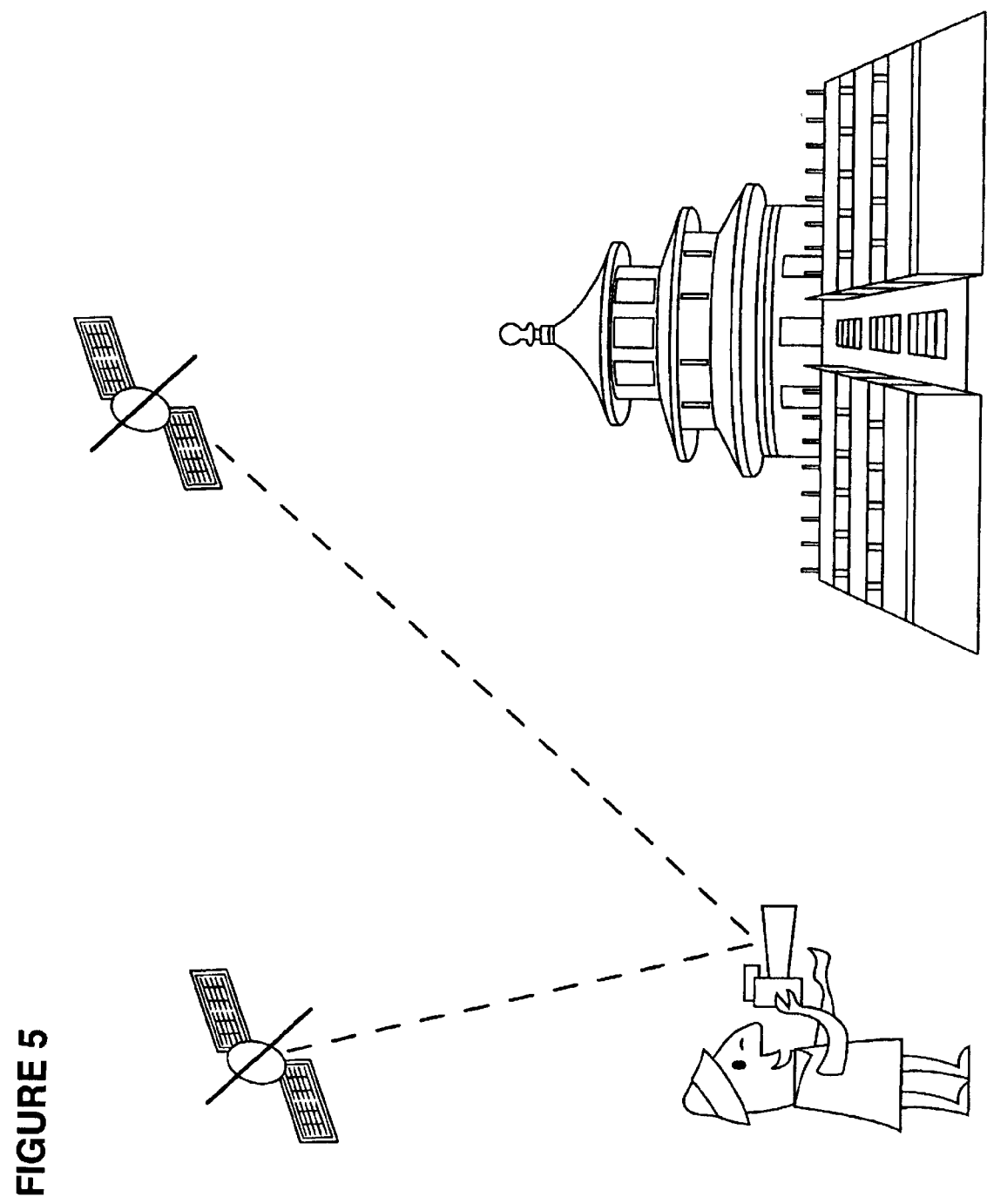
FIG. 5 is a diagram of the apparatus in use.
Figure 6:
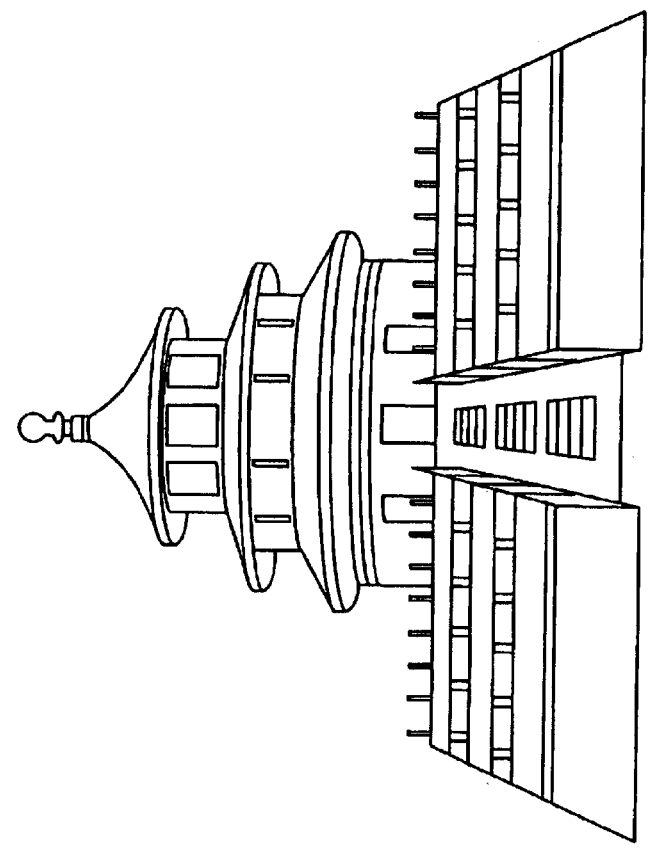
FIG. 6 is a diagram of the view through the viewfinder of the object.

The invention uses an optical apparatus 10 such as binoculars, camera, video camera and the like for the optical detection of objects 100 such as geographical locations, historic or tourist sites, persons, vehicles, and the like, whose identifying data are stored in satellite-aided transmission systems 110 and/or the device's computer and/or the internet.

This optical apparatus 10 contains a component that allows for the optical fine focusing on an object 20, with reference to the compass direction into which the apparatus 10 is pointed. The apparatus contains a component that detects the distance 120 between apparatus and the object. This may be done by optical or other means. The distance data includes electronic data, that can be processed further. The apparatus contains a measurement unit 30 that detects the angle of incline between global identification lines, such as magnetic identification lines, and the target line. The apparatus contains a receiving unit 40 to receive signals from satellites, wireless communication system, a computer system or other electronic system such as a wireless internet connection and contains a computer 50 for data processing. The computer 50 processes the distance data described above, data regarding the angle of incline, satellite signals and the data from the satellite-aided transmission systems 110, their storage or other sources. Information regarding the object is displayed. The data may be displayed automatically.

The computer 50 of this invention processes the distance value, which may vary with fine focus. Data regarding the currently selected object 100 will appear on the information display 60 after fine focusing.

In one embodiment, the computer 50 works exclusively with electronic inputs. In another embodiment of the invention, the display 60 consists of a display unit with a LCD (liquid crystal display) with transparent electrodes on the display surface. Another embodiment of the invention, uses a printer 90 as the display to print out the results. In yet another, embodiment of the invention, the data is processed into acoustical signals and a loudspeaker 80 serves as the display. In another embodiment of the invention a navigation satellite system 110 is used for determining the location of the optical apparatus 10. In another embodiment of the invention, the measurement unit 30 cooperates with a compass (not shown) to detect the azimuth angle between the target line and the North-South direction. Another embodiment of the invention uses a height-measuring device 70 to detect the elevation angle between the target line and the horizontal and/or the vertical.

The inventive optical apparatus provides nearly instantaneous identification of fixed objects. The user is able to receive accurate information about the object directly on the screen or viewfinder.

In order to determine the position of the target object, the inventive optical device has a global positioning device, an electronic compass, a range finder, a goniometer and an altimeter, a computer or other processing system, a transmission unit and receiving unit. The GPS identifies the location of the user. Its accuracy may be limited, for example to within 15 feet.

The electric compass, range finder and goniometer are used to determine the relative position of the target object compared to the optical device. The altimeter is used to detect the height of the optical device relative to sea level.

The data is used to determine the exact geographical position of the optical device and the identification of the object, based on a comparison of the data and information in a digital map or other data.

The location data of the device may also be refined after comparison with the digital map to correct for GPS variance.

The identification of the object may include a name, description, location data and additional information. For example, if the optical device has blue tooth, infrared or similar capabilities, the device can be linked to a range of other devices and the object data could include building plans or maps, record environmental data such as pollution, noise etc., initialize communication upon arrival or identification of a particular location or transmit emergency calls or signals.

When the optical device is a camera, video recorder or is linked to a camera or video recorder, there is no need to label the pictures or videos as the identifying data has already been captured and can be saved with the recording.

An object, such as a village, person, mountain, at a distance from an observer is viewed 130 by the observer using an optical apparatus. The observer adjusts the fine focus 150 of the apparatus and the apparatus detects the distance between the object and the apparatus 130. The apparatus receives target data 160 from a satellite and processed 170 the target data. Object data is computed 180 by the computer of the apparatus and the object data 190 is displayed.

For example, a tourist in Beijing, China may focus his inventive camera on a historic site. The GPS determines the location of the tourist is 39°54' North latitude and 116°23' East longitude. The range finder detects that the tourist is 20 m from the object. The compass detects that the camera direction is 0° N. The goniometer detects that the angle of inclination to the object is 0°. The altimeter detects that the tourist is 43 m above sea level. The computer in the camera transmits the data, receives the data and/or compresses data to stored map and informational data to determine that the object is the Temple of Heaven. The tourist sees identification data in the viewfinder of his camera.

The informational data and/or maps can be preloaded in the optical device, be downloaded by the user prior to traveling to a particular area, or downloaded in a wireless manner during use.

Other advantages and advantageous embodiments of the invention may be derived from the claims.

The device may be used by individuals, tourists, sports spectators, for general recreational purposes, for navigation, or for general recording purposes. It may be used by organizations such as for research or observation. It may be used by the military for navigation, identification of targets and/or to transfer mission information.

All of the characteristics shown in the description and the following claims may be essential to the invention by themselves or in any possible combination with each other.

What is claimed is:

1. An optical apparatus for the optical detection of an object having identifying data stored in satellite-aided transmission systems, comprising:

an optical fine focus;

a first measuring device to detect distance to the object;

a second measuring device to detect an angle of inclination between the apparatus and the object;

a direction detector to detect the direction to the object;

a positioning system to detect a location of the apparatus;

a third measuring device to detect the altitude of the apparatus;

a display;

a receiver to receive wireless signals; and a computer to process location data to determine identification data of the object coupled to the first measuring device, the second measuring device, the third measuring device, the positioning system, the receiver, the direction detector and the display;

wherein the location data is selected from the group consisting of:

distance, angle of inclination, wireless signals, location of the apparatus, direction, altitude and combinations thereof; and identification data for the object appears on the display.

2. The apparatus of claim 1 wherein location is determined using a navigation satellite and the positioning system is a global positioning system (GPS) and the wireless signals comprise satellite signals.

3. The apparatus of claim 2 wherein the first measuring device is a distance detector, the second measuring device is a goniometer, the third measuring device is an altimeter, and the direction detector is a compass.

4. The apparatus of claim 3 wherein the computer compares the location data with electronic information to determine the identification data.

5. The apparatus of claim 4 wherein the electronic information comprises a digital map.

6. The apparatus of claim 4 wherein the electronic information is stored in the computer.

7. The apparatus of claim 4 wherein the electronic information is downloaded to the computer.

8. The apparatus of claim 1 wherein the display is a liquid crystal display with transparent electrodes on the display surface.

9. The apparatus of claim 1 wherein the display is a printer.

10. The apparatus of claim 1 wherein the computer cooperates with a sound producing apparatus and a loudspeaker and the identification data is processed into audible signals.

11. A method of identifying an object comprising the steps of:

obtaining an optical apparatus, said optical apparatus having the ability to focus on the object;

focusing on the object with the optical apparatus;

determining location data, said determination of location data comprising the steps of:

determining direction of the object relative to the optical apparatus;

detecting the distance between the optical apparatus and the object;

detecting the angle of incline between the optical apparatus and the object;

detecting the location of the apparatus; and measuring the altitude of the apparatus, processing location data to determine identification data; and providing identification data to a user.

12. The method of claim 11, wherein the identification data is provided on a display.

13. The method of claim 11, further comprising the step of printing identification data.

14. The method of claim 11, further comprising the steps of:

translating identification data into acoustical signals; and broadcasting the acoustical signals.

15. The method of claim 11, wherein the optical apparatus is selected from the group consisting of binoculars, camera, video recorder, and digital recorder.

16. The method of claim 11 wherein the location data is processed by comparing the location data to the electronic data, and said electronic data is stored in a computer in the apparatus.

17. The method of claim 11 further comprising the step of downloading electronic data wherein the location data is processed by comparing the location data to the electronic data.

18. The method of claim 11 further comprising the step of updating the location of the apparatus based on data related to the object.

19. The method of claim 18 further comprising the step of displaying the updated location to the user.

* * * * *